US007299225B2

(12) United States Patent
Tran et al.

(10) Patent No.: US 7,299,225 B2
(45) Date of Patent: Nov. 20, 2007

(54) HIGH PERFORMANCE PREDICATE PUSH-DOWN FOR NON-MATCHING PREDICATE OPERANDS

(75) Inventors: Brian T. Tran, San Jose, CA (US); Hsiuying Y. Cheng, Fremont, CA (US); Shuanglin Guo, San Jose, CA (US); Patrick M. Malone, Campbell, CA (US); Thomas A. Beavin, Milpitas, CA (US); Xiazhen Wang, San Jose, CA (US); Xun Li, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 10/304,220

(22) Filed: Nov. 26, 2002

(65) Prior Publication Data

US 2004/0103082 A1 May 27, 2004

(51) Int. Cl.
*G06F 17/30* (2006.01)
(52) U.S. Cl. .................. 707/5; 707/2; 707/3; 707/4
(58) Field of Classification Search .................. 707/2, 707/3, 103, 6, 4, 5
See application file for complete search history.

(56) References Cited

U.S. PATENT DOCUMENTS

| 5,386,568 | A * | 1/1995 | Wold et al. .................. 717/162 |
| 6,032,143 | A | 2/2000 | Leung et al. |
| 6,088,524 | A | 7/2000 | Levy et al. |
| 6,345,266 | B1 | 2/2002 | Ganguly et al. |
| 6,381,616 | B1 | 4/2002 | Larson et al. |
| 6,385,603 | B1 | 5/2002 | Chen et al. |
| 6,438,541 | B1 | 8/2002 | Witkowski |
| 6,578,090 | B1 * | 6/2003 | Motoyama et al. ......... 719/315 |
| 6,622,138 | B1 * | 9/2003 | Bellamkonda et al. ......... 707/2 |
| 6,748,377 | B1 | 6/2004 | Attaluri |
| 2001/0037322 | A1 | 11/2001 | Lindsay et al. |
| 2001/0051949 | A1 | 12/2001 | Carey et al. |
| 2002/0016907 | A1 | 2/2002 | Grochowski et al. |
| 2002/0069193 | A1 | 6/2002 | Beavin et al. |
| 2002/0078015 | A1 | 6/2002 | Ponnekanti |
| 2002/0112148 | A1 | 8/2002 | Wang et al. |
| 2002/0120620 | A1 | 8/2002 | Chan et al. |
| 2003/0135758 | A1 * | 7/2003 | Turner ..................... 713/201 |
| 2003/0187858 | A1 * | 10/2003 | Kirk et al. ................. 707/100 |
| 2004/0111713 | A1 * | 6/2004 | Rioux ....................... 717/137 |
| 2004/0128657 | A1 * | 7/2004 | Ghiya et al. ................ 717/141 |
| 2004/0268309 | A1 * | 12/2004 | Grover et al. ............. 717/120 |
| 2005/0015673 | A1 * | 1/2005 | Plesko et al. ................ 714/38 |

(Continued)

OTHER PUBLICATIONS

"Type-Checking OQL Queries in the ODMG Type Systems" by Suad Alagic, ACM transactions on Database Systems, vol. 24, No. 3, Sep. 1999, pp. 319-360.*

(Continued)

*Primary Examiner*—Don Wong
*Assistant Examiner*—Thanh-Ha Dang
(74) *Attorney, Agent, or Firm*—Gates & Cooper LLP

(57) ABSTRACT

A method, apparatus, and article of manufacture for improving the performance of evaluating predicates with non-matching operands by aggressively casting the input value to the data type of the target column before the data of the target column is accessed.

60 Claims, 3 Drawing Sheets

U.S. PATENT DOCUMENTS

2005/0039124 A1* 2/2005 Chu et al. .................. 715/531
2005/0097084 A1* 5/2005 Balmin et al. ................ 707/3
2005/0097523 A1* 5/2005 Uchida ...................... 717/136

OTHER PUBLICATIONS

"C How To Program" by H.M. Deitel/P.J. Deitel, 2nd edition, Prentice Hall 1994, 1992, pp. 61, 73-74, 122-125, 158, and 699-700.*

"Coping With Type Casts in C" by Michael Siff, Satish Chandra, Thomas Ball, Krishna Kunchithapadam, and Thomas Reps, Mathematics Department, Sarah Lawrence Colleg, Bronxville, NY 10708-5999; Bell Laboratories, Lucent Technologies, Naperville, IL 60566.*

"ORACLE7 The Complete Reference" by George Koch, Covers Versions 6 & 7, pp. 147, 150-151, 738, 762, and 896-897.*

W. Zhang et al., "Speeding up Heterogeneous Data Access by Converting and Pushing down String Comparisons," IEEE, 1999, 3 pages.

* cited by examiner

HIGH PERFORMANCE PREDICATE PUSH-DOWN FOR NON-MATCHING PREDICATE OPERANDS

BACKGROUND OF THE INVENTION

1. Field of the Invention

This invention relates in general to database management systems performed by computers, and in particular, to the optimization of queries using a high performance predicate push-down for non-matching predicate operands.

2. Description of Related Art

Computer systems incorporating a Relational DataBase Management System (RDBMS) using a Structured Query Language (SQL) interface are well known in the art. The SQL interface has evolved into a standard language for the RDBMS and has been adopted as such by both the American Nationals Standard Institute (ANSI) and the International Standards Organization (ISO).

In an RDBMS, predicates of SQL queries can be evaluated at various stages and the performance of the predicates can be significantly different depending on where and when they are evaluated. Generally speaking, better performance is obtained when the predicate is evaluated at an earlier stage.

Without loss of generality, assume that the predicates are of the form "column operator expression," which is abbreviated as "col op exp," where:

"col" represents an inner table column, also known as a target column;

"exp" represents an input value, which could be a literal value, constant expression, column or column expression; and "op" represents a comparison operator, such as =, <>, >, >=, <, <=, etc.

Most, if not all, RDBMS attempt to "push down" predicates to a data manager or index manager for better performance. For example, consider a query against a 10,000 row table with predicate P1 whose filter factor is 1%. In the prior art, P1 may be evaluated only after all 10,000 rows are fetched, which results in P1 being evaluated 10,000 times, i.e., once for each row. Alternatively, P1 could be used to determine a search range in a B-tree index, which results in only 100 rows being fetched (i.e., 1% of the rows).

For predicates with non-matching operands, such as type, length, or CCSID (Coded Character Set ID), the operands are "cast" to a common data type, length and CCSID before the comparison takes place. The term "cast" in this context refers to a conversion between data types. In the prior art, depending on the data types of both operands in the predicate, either or both the target column and the input value may be "cast-up" to a common data type before the operator of the predicate is performed.

One prior art approach is to always cast-up the "smaller" operand to match the "larger" one. The cast-up could be performed on the input value, target column, or both. For example, in a predicate comprised of "integer_col op smallint_exp," the input value "smallint_exp" may be cast-up to "integer," the data type of the target column "integer_col." In another example, in a predicate comprised of "smallint_col op integer_exp," each target column "smallint_col" may be cast-up to "integer," the data type of the input value "integer_exp." In yet another example, in a predicate comprised of "decimal(5,3)_col op decimal(7,1)_exp," both operands maybe cast-up to the data type "decimal(9,3)."

Although this is easy to implement, always casting up the smaller operand may cause excessive data conversions, for example, when the operand being cast-up is a target column. In this situation, the system has to convert every row it retrieves from the inner table. This is an enormous amount of data conversion overhead, which could significantly slow down performance, especially when predicates involve a large number of table accesses.

This can be best described by means of an example. Assume that the SALARY column of the EMPLOYEE table is an "integer" data type, and the following SQL query is executed:

SELECT*FROM EMPLOYEE E WHERE E.SALARY>70000.00

Casting the SALARY column to "float" results in a data conversion for each row fetched. It would be desirable if, in this example, the data conversion takes place only once for the entire query. This requires that, instead of casting up the SALARY column, the input value "70000.00" be cast-down to "integer," which works since there is a corresponding value in the integer domain for 70000.00, i.e., 70000. However, this is not a safe conversion in general, since certain floating point numbers may not fall in the range of a 4-byte integer.

Thus, there is a need in the art for a technique that obtains aggressive predicate push down with reduced casts, which is accomplished by the present invention. Specifically, the present invention supports "cast-down," which allows casts such as "integer" to "smallint," "char(32)" to "varchar(16)," etc., as well as cast-up. Using a cast-up or cast-down, the present invention always casts the input value to the data type of the target column, which significantly reduces the overhead involved in data conversions.

Moreover, instead of blindly making judgments that an attempt to cast "integer" to "smallint" will fail, the present invention permits the RDBMS to perform the cast and then to determine from the result whether the cast will succeed or fail. For example, a cast of the string "database" of type "varchar(15)" to type "char(10)" will succeed.

Further, even failed casts can improve the performance of the RDBMS. For example, in a predicate comprised of "decimal(2,1)_col=1234.5," a cast failure indicates that the predicate is always false, which leads the RDBMS to skip the table access. Thus, the RDBMS can properly identify and evaluate failed casts, which significantly reduces the overhead of data conversions.

SUMMARY OF THE INVENTION

To overcome the limitations in the prior art described above, and to overcome other limitations that will become apparent upon reading and understanding the present specification, the present invention discloses a method, apparatus, and article of manufacture for improving the performance of evaluating predicates with non-matching operands by aggressively casting the input value to the data type of the target column before the data of the target column is accessed.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural and functional changes may be made without departing from the scope of the present invention.

Hardware Environment

Figure 1:
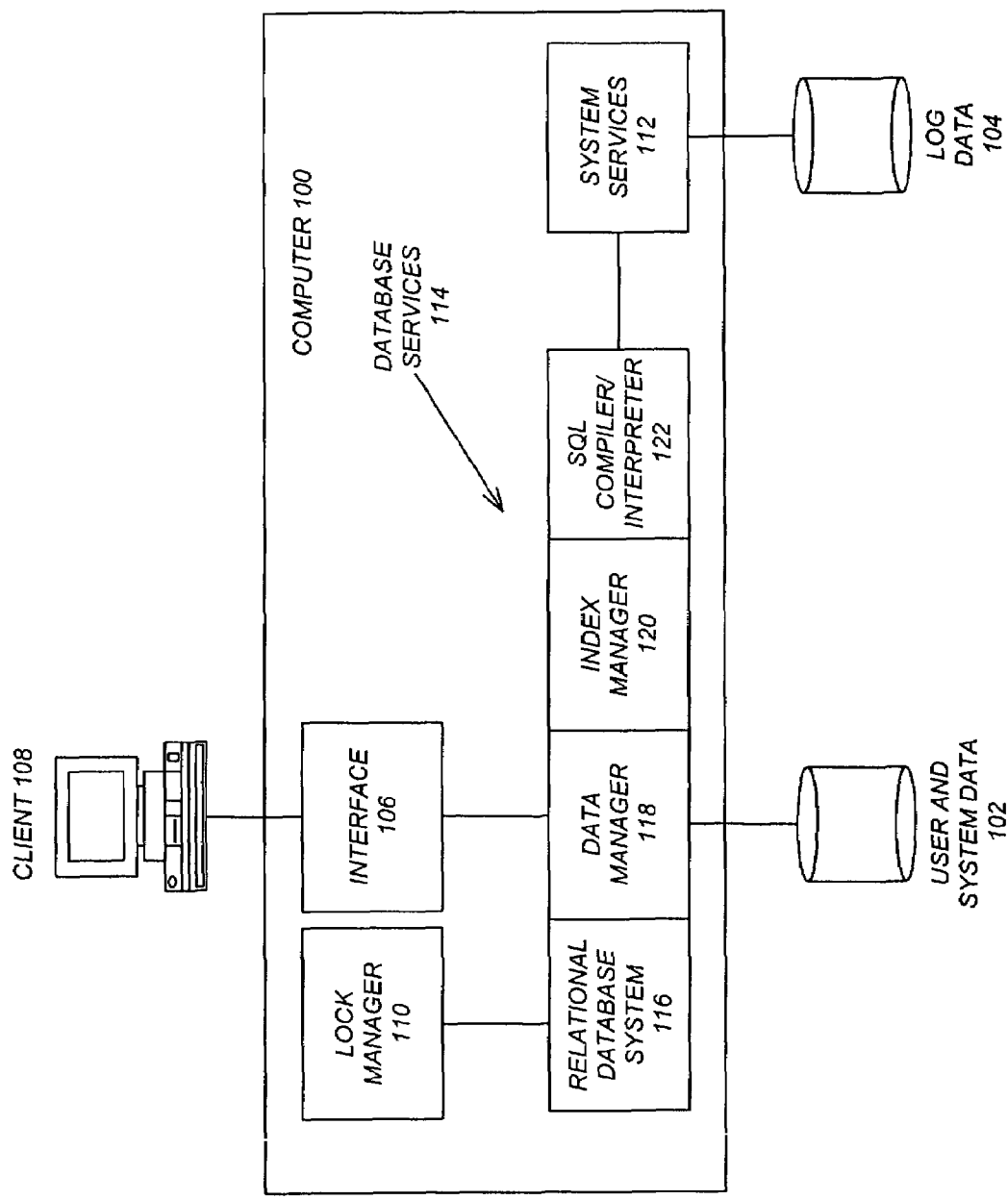
FIG. 1 illustrates an exemplary computer hardware and software environment that could be used with an embodiment of the present invention.

FIG. 1 illustrates an exemplary computer hardware and software environment that could be used with an embodiment of the present invention. In the exemplary environment, a computer system 100 is comprised of one or more processors connected to one or more data storage devices 102 and 104, such as disk drives, that store one or more relational databases.

An interface 106, such as TCP/IP™, IMS/DB/DC™, CICS™, TSO™, WINDOWS™ or other similar interface, is used to connect a client computer 108 to the computer 100, in order that client computer 108 may transmit electrical signals to and from the computer system 100 that represent commands for performing various search and retrieval functions, termed queries, against the databases. In the present invention, these queries conform to the Structured Query Language (SQL) standard, and invoke functions performed by a Relational DataBase Management System (RDBMS). In the preferred embodiment of the present invention, the RDBMS comprises the DB2™ product offered by I.B.M. Corporation for the MVS™, UNIX™, or WINDOWS™ operating systems. Those skilled in the art will recognize, however, that the present invention has application to any RDBMS.

As illustrated in FIG. 1, the RDBMS includes three major components: a Lock Manager module 110, Systems Services module 112, and Database Services module 114. The Lock Manager module 110 handles locking services, because the RDBMS treats data as a shared resource, thereby allowing any number of users to access the same data simultaneously, and thus concurrency control is required to isolate users and to maintain data integrity. The Systems Services module 112 controls the overall RDBMS execution environment, including managing log data sets 106, gathering statistics, handling startup and shutdown, and providing management support.

At the heart of the RDBMS architecture is the Database Services module 114. The Database Services module 114 contains several submodules, including the Relational Database System (RDS) 116, the Data Manager 118, and the Index Manager 120, as well as other components, such as an SQL compiler/interpreter 122. These submodules support the functions of the SQL language, i.e., definition, access control, retrieval, and update of user and system data.

Generally, each of the components, modules, and submodules of the RDBMS comprise instructions and/or data, and are embodied in or retrievable from a computer-readable device, medium, signal or carrier, e.g., a memory, a data storage device, a remote device coupled to the computer 100 by a data communications device, etc. Moreover, these instructions and/or data, when read, executed, and/or interpreted by the computer 100, cause the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture," or alternatively, "computer program carrier," as used herein is intended to encompass a computer program accessible from any computer-readable device, carrier, or media. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

Operation of the Preferred Embodiment

The present invention improves the performance of evaluating predicates with non-matching operands by aggressively casting the input value to the data type of the target column before the data of the target column is accessed.

Consider the following example. Assume that the predicate of a two table join is comprised of "$T_{inner}, C_{inner}=T_{outer}, C_{outer}$" wherein $T_{inner}$ is an inner table, $C_{inner}$ is a column of the inner table, $T_{outer}$ is an outer table, and $C_{outer}$ is a column of the outer table, and in which $C_{inner}$ and $C_{outer}$ have different data types. Moreover, assume that $T_{inner}$ has 10,000 rows and $T_{outer}$ has 3,000 rows.

In the prior art, if $C_{outer}$ can be cast to the data type of the target column $C_{inner}$, it will involve 3,000 casts (for each row of $T_{outer}$). On the other hand, if $C_{outer}$ cannot be cast to the data type of the target column $C_{inner}$, then $C_{inner}$ needs to be cast to the data type of the input value $C_{outer}$ (for each row of $T_{inner}$ and $T_{outer}$). This casting of the target column will result in 30,000,000 casts (10,000*3,000) only on $T_{inner}$ and 30,003,000 casts (30,000,000+3,000) on both $T_{inner}$ and $T_{outer}$.

With the present invention, $C_{outer}$ is cast to the data type of $C_{inner}$ only once before $T_{inner}$ is accessed. Therefore, no cast is needed on $C_{inner}$. Consequently, the total number of casts (3000) is dramatically reduced, as compared to the prior art approach.

Generally, in the technique of the present invention, the input value is cast to the data type of the target column before accessing the target table. Depending on the data types of the input value and target column, the cast could be a cast-up or cast-down.

A cast-up should never fail. Therefore, no special handling is needed before the predicate is pushed down to the Data Manager 118 or Index Manager 120. Prior art implementations will suffice.

However, a cast-down is more complicated. In some cases, the cast-down could be successful, for example, a cast-down of a 4-byte "integer" value of "1" to a 2-byte "smallint" value of "1". In many other cases, however, a cast-down could be problematic, due to overflow, underflow, or loss of precision errors.

Consider an example that casts "decimal_col" to "smallint":

An overflow error occurs if the value of the decimal_col is larger than MAX_SMALLINT ("32767").

An underflow error occurs if the value of the decimal_col is smaller than MIN_SMALLINT ("−32768")

A loss of precision error occurs when the decimal digits are truncated when cast from "decimal_col" to "smallint." For example, a loss of precision results when a decimal "123.65" is truncated to "123."

If the RDBMS detects any type of error during the cast, based on a comparison operator of the predicate and the error symptom, then the RDBMS pre-processes the predicate and replaces it with an appropriately revised predicate. If the revised predicate is "FALSE," then the target table access is skipped, or if the revised predicate is "TRUE," then the predicate evaluation is skipped; otherwise, the revised predicate is pushed down to the data manager or index manager.

The following describes how errors in the cast-down are handled by the RDBMS.

A. If the operator is "=" (EQUAL), then the predicate is replaced by "FALSE," and table access is skipped. Example: the predicate comprises "smallint_col=decimal_col," and the value of the decimal_col is larger than MAX_SMALLINT ("32767").

B. If the operator is "<>" (NOT EQUAL), then the predicate is to be replaced by "TRUE, " predicate evaluation is skipped and all records of target table are fetched. Example: the predicate comprises "smallint_col<>decimal_col," and the value of the decimal_col is larger than MAX_SMALLINT ("32767").

C. If the operator is ">" (GREATER THAN), ">=" (GREATER THAN OR EQUAL TO), "<" (LESS THAN) or "<=" (LESS THAN OR EQUAL TO), then the predicate is replaced by a revised predicate based on the error symptom of the cast.

1. Case 1: Overflow Error

If the operator is ">" or ">=," then the predicate is replaced by "FALSE." Example: the predicate comprises "smallint_col>decimal_col," and the value of decimal_col is larger than MAX_SMALLINT ("32767").

If the operator is "<" or "<=," then the predicate is replaced by "TRUE." Example: the predicate comprises "smallint_col>decimal_col," and the value of the decimal_col is larger than MAX_SMALLINT ("32767").

2. Case 2: Underflow Error

If the operator is ">" or ">=," then the predicate is replaced by "TRUE." Example: the predicate comprises "smallint_col>decimal_col," and the value of decimal_col is smaller than MIN_SMALLINT ("−32768").

If the operator is "<" or "<=," then the predicate is replaced by "FALSE." Example: the predicate comprises "smallint_col<decimal_col," and the value of decimal_col is smaller than MIN_SMALLINT ("−32768").

3. Case 3: Loss of Precision Error

If the operator is ">" or "<=," then the input value is rounded down to the data type of the target column. If an underflow error occurs during the round down, then the predicate is handled in the same way as Case 2 above. Instead of the original predicate, the revised predicate is pushed down to the data manager or index manager. Example: the predicate is comprised of "smallint_col>decimal_col(10,2)," and the "decimal" value is cast to "smallint."

If the input decimal value is "123.65," then a loss of precision error occurs due to truncation. In this case, the input value is rounded down to "123," and the "smallint" value "123" is used as the input value to compare with "smallint_col."

If the input decimal value is "−32768.3," then it is rounded down to "−32769," which is smaller than MIN_SMALLINT (−32768). The predicate is replaced by "TRUE" if the operator is ">," or "FALSE" if the operator is "<=."

If the operator is "<" or ">=," then the input value is rounded up to the data type of the target column. If an overflow error occurs during the round up, then the predicate is handled in the same way as Case 1 above. Instead of the original predicate, the revised predicate is pushed down to the data manager or index manager. Example: the predicate is comprised of "smallint_col<decimal_col," and the "decimal" value is cast to "smallint."

If the input decimal value is "123.65," then a loss of precision error occurs due to truncation. In this case, the input value is rounded up to "124" and the "smallint" value "124" is used as the input value to compare with the "smallint_col."

If the input decimal value is "32767.3," then it is rounded up to "32768," which is larger than MAX_SMALLINT (32767). The predicate is replaced by "TRUE" if operator is "<" or "FALSE" if operator is ">=."

With the support of cast-down, input values of all data types can be aggressively cast to the data type of the target column, except for one case: when the input value is "float" and the target column is "decimal(p,s)" with p>15. The imprecise representation of the "float" data type makes the mapping between "float" data and "decimal" data be 1-to-n if the precision of the "decimal" data is beyond what the "float" type can represent (i.e., p>15). That is, when mapping from "float" type to "decimal" type, the digits after the 15th digit of "decimal" data become insignificant. For example, a "float" value of 1.0e+0 is considered to be "equal" to "decimal" value 1.000 . . . 0001, 1.000 . . . 0002, . . . , or 1.000 . . . 0009, if the last digit of the "decimal" value in this example is beyond the 15$^{th}$ digit.

The approach to solve this problem is to add an extra range predicate that can be pushed down to the Data Manager 118 or Index Manager 120 to screen out the rows of the inner column table before evaluating the original predicate. This extra range predicate is indexable, sargable, and highly selective. As a result, the Index Manager 120 is able to use it to construct very narrow start and stop keys to restrict the range of rows to be retrieved, so that only a few of rows are fetched. The evaluation time of the original predicate would be significantly reduced.

Consider the following example, where is the predicate is comprised of "decimal_col=float_col" and the "decimal_col" is defined as "decimal (17,16)." In addition to the original predicate, an indexable and sargable range predicate is added as:

decimal_col BETWEEN (CAST (float_col AS DECIMAL)-δ) AND (CAST (float_col AS DECIMAL)+δ)

Where δ is a small constant in the "decimal_col" data type. Since a cast from "float" to "decimal" is a problematic cast, an overflow or underflow error can occur. If an overflow or underflow error occurs, the predicate is handled in the same way, as either Case 1 or Case 2 above.

Logic of the Preferred Embodiment

Figure 2:
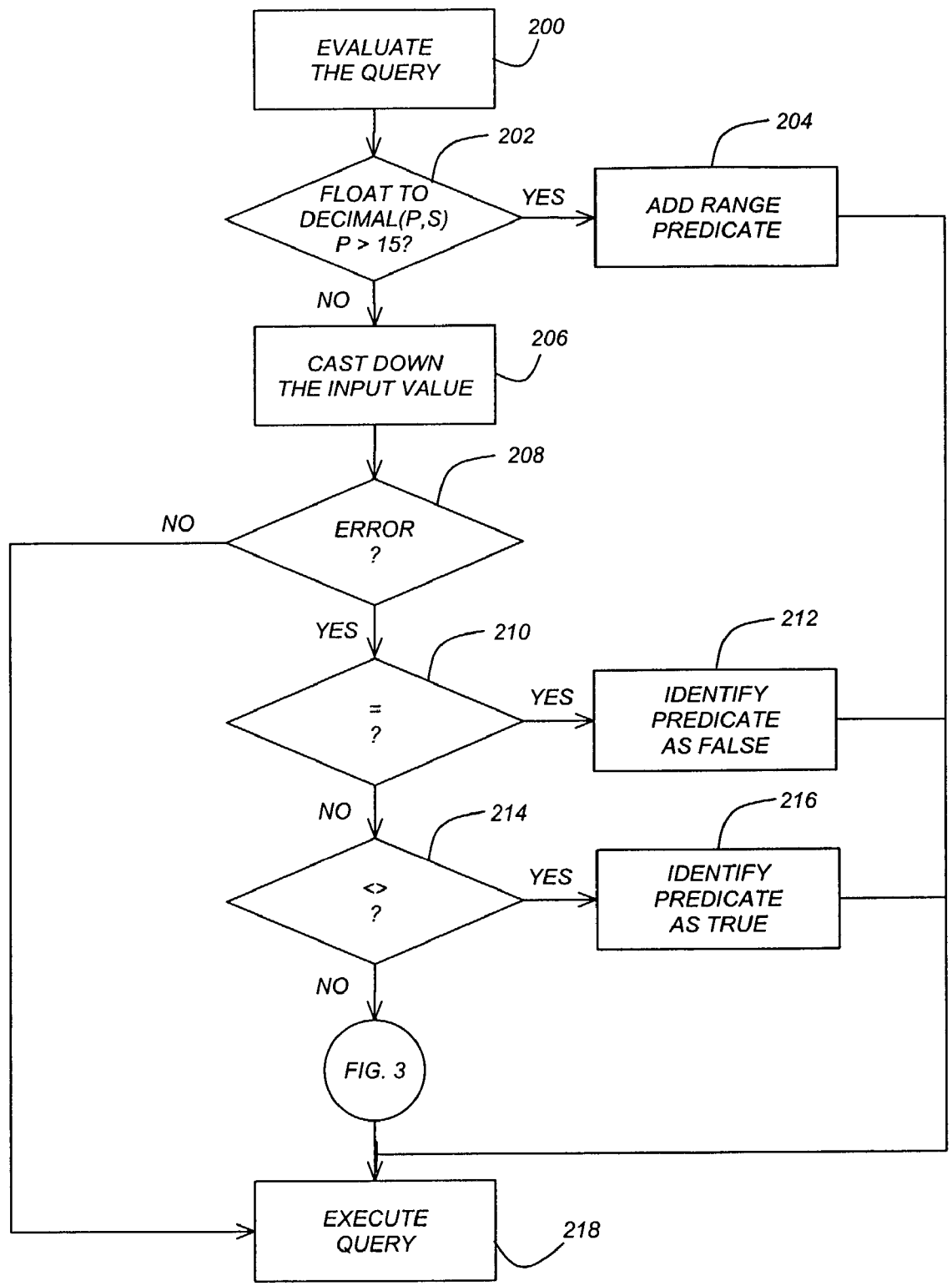
FIGS. 2 and 3 are flowcharts illustrating a method of optimizing a query in a computer system, the query being performed by the computer system to retrieve data from a database stored on the computer system, according to the preferred embodiment of the present invention.
Figure 3:
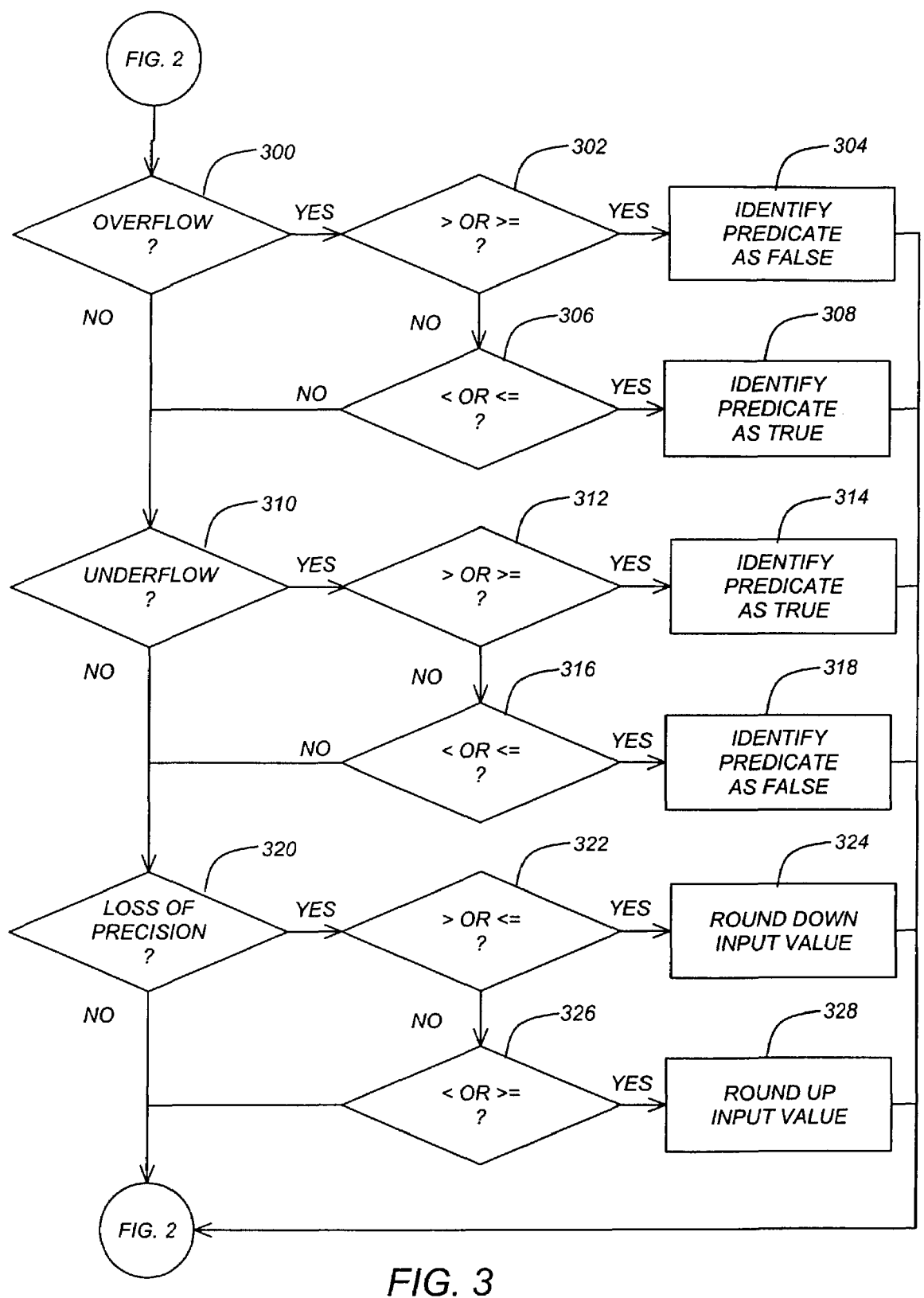

FIGS. 2 and 3 are flowcharts illustrating a method of optimizing a query in a computer system, the query being performed by the computer system to retrieve data from a database stored on the computer system, according to the preferred embodiment of the present invention.

Referring to FIG. 2, Block 200 represents the RDBMS evaluating the query, wherein the query is comprised of at least one predicate having a first operand comprising an input value, an operator and a second operand comprising a target column.

Block 202 is a decision block that represents the RDBMS determining whether an attempt is being made to cast-down a "float" input to a "decimal" target column, when the "decimal" target column has a precision greater than 15. If so, control transfers to Block 204; otherwise, control transfers to Block 206.

Block 204 represents the RDBMS adding a range predicate when casting down a "float" input value to a "decimal" target column, when the "decimal" target column has a precision greater than 15. The range predicate is used to construct start and stop keys to restrict a range of rows to be retrieved, so that only a few of the rows are fetched. Thereafter, control transfers to Block 218.

Block 206 represents the RDBMS casting down the input value to a data type of the target column before the target column is accessed, when the evaluated query has non-matching first and second operands in the predicate.

Block 208 is a decision block that represents the RDBMS determining whether an error occurred when the input value is cast-down, wherein the error is selected from a group comprising overflow, underflow, or loss of precision errors. If so, control transfers to Block 206; otherwise, control transfers to Block 218.

The logic in the following Blocks comprises detecting the error during the cast-down, based on the operator of the predicate and the error, and then processing the predicate, i.e., not accessing the target column when the predicate is false, not evaluating the predicate when the predicate is true, and pushing down the predicate when the predicate is neither true nor false. This logic is described in more detail below.

Block 210 is a decision block that represents the RDBMS determining whether an operator of the predicate is an "EQUAL" (=) operator. If so, control transfers to Block 212; otherwise, control transfers to Block 214.

Block 212 represents the RDBMS identifying the predicate as false, and not accessing the target column, when an operator of the predicate is an "EQUAL" operator. Thereafter, control transfers to Block 218.

Block 214 is a decision block that represents the RDBMS determining whether an operator of the predicate is a "NOT EQUAL" (<>) operator. If so, control transfers to Block 216; otherwise, control transfers to FIG. 3.

Block 216 represents the RDBMS identifying the predicate as true, not evaluating the predicate, and fetching all rows of the target column, when an operator of the predicate is a "NOT EQUAL" operator. Thereafter, control transfers to Block 218.

Block 218 represents the RDBMS executing the query.

Referring to FIG. 3, this logic is performed when an operator of the predicate is a "GREATER THAN" (>), "GREATER THAN OR EQUAL TO" (>=), "LESS THAN" (<) or "LESS THAN OR EQUAL TO" (<=) operator.

Block 300 is a decision block that represents the RDBMS determining whether an overflow error occurred. If so, control transfers to Block 302; otherwise, control transfers to Block 310.

Block 302 is a decision block that represents the RDBMS determining whether an operator of the predicate is a "GREATER THAN" (>), or "GREATER THAN OR EQUAL TO" (>=) operator. If so, control transfers to Block 304; otherwise, control transfers to Block 306.

Block 304 represents the RDBMS identifying the predicate as false when the error is an overflow error and the operator of the predicate is a "GREATER THAN" or "GREATER THAN OR EQUAL TO" operator. Thereafter, control returns to FIG. 2.

Block 306 is a decision block that represents the RDBMS determining whether an operator of the predicate is a "LESS THAN" (<) or "LESS THAN OR EQUAL TO" (<=) operator. If so, control transfers to Block 308; otherwise, control transfers to Block 310.

Block 308 represents the RDBMS identifying the predicate as true when the error is an overflow error and the operator of the predicate is a "LESS THAN" or "LESS THAN OR EQUAL TO" operator. Thereafter, control returns to FIG. 2.

Block 310 is a decision block that represents the RDBMS determining whether an underflow error occurred. If so, control transfers to Block 312; otherwise, control transfers to Block 320.

Block 312 is a decision block that represents the RDBMS determining whether an operator of the predicate is a "GREATER THAN" (>) or "GREATER THAN OR EQUAL TO" (>=) operator. If so, control transfers to Block 314; otherwise, control transfers to Block 316.

Block 314 represents the RDBMS identifying the predicate as true when the error is an underflow error and the operator of the predicate is a "GREATER THAN" or "GREATER THAN OR EQUAL TO" operator. Thereafter, control returns to FIG. 2.

Block 316 is a decision block that represents the RDBMS determining whether an operator of the predicate is a "LESS THAN" (<) or "LESS THAN OR EQUAL TO" (<=) operator. If so, control transfers to Block 318; otherwise, control transfers to Block 320.

Block 318 represents the RDBMS identifying the predicate as false when the error is an underflow error and the operator of the predicate is a "LESS THAN" or "LESS THAN OR EQUAL TO" operator. Thereafter, control returns to FIG. 2.

Block 320 is a decision block that represents the RDBMS determining whether a loss of precision error occurred. If so, control transfers to Block 322; otherwise, control returns to FIG. 2.

Block 322 is a decision block that represents the RDBMS determining whether an operator of the predicate is a "GREATER THAN" (>) or "LESS THAN OR EQUAL TO" (<=) operator. If so, control transfers to Block 324; otherwise, control transfers to Block 326.

Block 324 represents the RDBMS rounding down the input value to a data type of the target column when the error is a loss of precision error and the operator of the predicate is a "GREATER THAN" or "LESS THAN OR EQUAL TO" operator. Moreover, this Block represents the RDBMS identifying the predicate as true when the rounding down causes an underflow error and the operator of the predicate is a "GREATER THAN" operator. Further, this Block represents the RDBMS identifying the predicate as false when the rounding down causes an underflow error and the operator of the predicate is a "LESS THAN OR EQUAL TO" operator. Thereafter, control returns to FIG. 2.

Block 326 is a decision block that represents the RDBMS determining whether an operator of the predicate is a "LESS THAN" (<) or "GREATER THAN OR EQUAL TO" (>=) operator. If so, control transfers to Block 328; otherwise, control returns to FIG. 2.

Block 328 represents the RDBMS rounding up the input value to a data type of the target column when the error is a loss of precision error and the operator of the predicate is a "LESS THAN" or "GREATER THAN OR EQUAL TO" operator. Moreover, this Block represents the RDBMS identifying the predicate as true when the rounding up causes an underflow error and the operator of the predicate is a "GREATER THAN OR EQUAL TO" operator. Further, this Block represents the RDBMS identifying the predicate as false when the rounding up causes an underflow error and the operator of the predicate is a "LESS THAN" operator. Thereafter, control returns to FIG. 2.

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any software program using predicates could benefit from the present invention.

In summary, the present invention discloses a method, apparatus, and article of manufacture for improving the performance of evaluating predicates with non-matching operands by aggressively casting the input value to the data type of the target column before the data of the target column is accessed.

The foregoing description of the preferred embodiment of the invention has been presented for the purposes of illustration and description. It is not intended to be exhaustive or to limit the invention to the precise form disclosed. Many modifications and variations are possible in light of the above teaching.

What is claimed is:

1. A method of optimizing a query in a computer system comprising the steps of:
   (a) evaluating the query, wherein the query is comprised of at least one predicate having a first operand comprising an input value, an operator and a second operand comprising a target column;
   (b) casting down the input value to a data type of the target column before the target column is accessed, when the evaluated query has non-matching first and second operands in the predicate;
   (c) detecting when an error occurs when the input value is cast-down, and then processing the predicate based on the detected error and the operator associated with the predicate; and
   (d) performing the query in the computer system to retrieve data from a database in order to present the data to a user.

2. The method of claim 1, wherein the error is an overflow, underflow, or loss of precision error.

3. The method of claim 1, wherein the processing step further comprises the step of not accessing the target column when the predicate is false.

4. The method of claim 1, wherein the processing step further comprises the step of not evaluating the predicate when the predicate is true.

5. The method of claim 1, wherein the processing step further comprises the step of pushing down the predicate when the predicate is neither true nor False.

6. The method of claim 1, wherein the processing step further comprises the step of identifying the predicate as false, and nor accessing the target column, when the operator of the predicate is an "equal" operator.

7. The method of claim 1, wherein the processing step further comprises the step of identifying the predicate as true, not evaluating the predicate, and fetching all rows of the target column, when the operator of the predicate is a "not equal" operator.

8. The method of claim 1, wherein the processing step further comprises the step of replacing the predicate with a revised predicate based on the error, when the operator of the predicate is a "greater than," "greater than or equal to," "less tan" or "less than or equal to" operator.

9. The method of claim 8, wherein the processing step further comprises the step of identifying the predicate as false when the error is an overflow error and the operator of the predicate is a "greater than" or "greater than or equal to" operator.

10. The method of claim 8, wherein the processing step further comprises the step of identifying the predicate as true when the error is an overflow error and the operator of the predicate is a "less than" or "less than or equal to" operator.

11. The method of claim 8, wherein the processing step further comprises the step of identifying the predicate as true when the error as an underflow error and the operator of the predicate is a "greater than" or "greater than or equal to" operator.

12. The method of claim 8, wherein the processing step further comprises the step of identifying the predicate as false when the error is an underflow error and the operator of the predicate is a "less than" or "less than or equal to" operator.

13. The method of claim 8, wherein the processing step further comprises the step of rounding down the input value to a data type of the target column when the error is a loss of precision error and the operator of the predicate is a "greater than" or "less than or equal to" operator.

14. The method of claim 13, wherein the processing step further comprises the step of identifying the predicate as true when the rounding down causes an underflow error and the operator of the predicate is a "greater than" operator.

15. The method of claim 13, wherein the processing step further comprises the step of identifying the predicate as false when the rounding down causes an underflow error and the operator of the predicate is a "less than or equal to" operator.

16. The method of claim 8, wherein the processing step further comprises the step of rounding up the input value to a data type of the target column when the error is a loss of precision error and the operator of the predicate is a "less than" or "greater than or equal to" operator.

17. The method of claim 16, wherein the processing step further comprises the step of identifying the predicate as true when the rounding up causes an underflow error and the operator of the predicate is a "greater than or equal to" operator.

18. The method of claim 16, wherein the processing step further comprises the step of identifying the predicate as false when the rounding up causes an underflow error and the operator of the predicate is a "less than" operator.

19. The method of claim 8, wherein the processing step further comprises the step of adding a range predicate when casting down a "float" input value to a "decimal" target column, when the "decimal" target column has a precision greater than 15.

20. The method of claim 19, wherein the range predicate is used to construct start and stop keys to restrict a range of rows to be retrieved, so that only a few of rows are fetched.

21. A computer-implemented apparatus for optimizing a query, comprising:
   (a) a computer system;
   (b) logic, performed by the computer system, for;
      (1) evaluating the query, wherein the query is comprised of at least one predicate having a first operand comprising an input value, an operator and a second operand comprising a target column;
      (2) casting down the input value to a data type of the target column before the target column is accessed, when the evaluated query is has non-matching first and second operands in the predicate;
      (3) detecting when an error occurs when the input value is cast-down, and then processing the predicate based on the detected error and the operator associated with the predicate; and
      (4) performing the query to retrieve data from a database in order to present the data to a user.

22. The apparatus of claim 21, wherein the error is an overflow, underflow, or loss of precision error.

23. The apparatus of claim 21, wherein the logic for processing further comprises logic for not accessing the target column when the predicate is false.

24. The apparatus of claim 21, wherein the logic for processing further comprises logic for not evaluating the predicate when the predicate is true.

25. The apparatus of claim 21, wherein the logic for processing further comprises logic for pushing down the predicate when the predicate is neither true nor false.

26. The apparatus of claim 21, wherein the logic for processing further comprises logic for identifying the predicate as false, and nor accessing the target column, when the operator of the predicate is an "equal" operator.

27. The apparatus of claim 21, wherein the logic for processing further comprises logic for identifying the predicate as true, not evaluating the predicate, and fetching all rows of the target column, when the operator of the predicate is a "not equal" operator.

28. The apparatus of claim 21, wherein the logic for processing further comprises logic for replacing the predicate with a revised predicate based on the error, when the operator of the predicate is a "greater than," "greater than or equal to," l"less than" or "less than or equal to" operator.

29. The apparatus of claim 28, wherein the logic for processing further comprises logic for identifying the predicate as false when the error is an overflow error and the operator of the predicate is a "greater than" or "greater than or equal to" Operator.

30. The apparatus of claim 28, wherein the logic for processing further comprises logic for identifying the predicate as true when the error is an overflow error and the operator of the predicate is a "less than" or "less than or equal to" operator.

31. The apparatus of claim 28, wherein the logic for processing further comprises logic for identifying the predicate as true when the error is an underflow error and the operator of the predicate is a "greater than" or "greater than or equal to" operator.

32. The apparatus of claim 28, wherein the logic for processing further comprises logic for identifying the predicate as false when the error is an underflow error and the operator of the predicate is a "less than" or "less than or equal" operator.

33. The apparatus of claim 28, wherein the logic for processing further comprises logic for rounding down the input value to a data type of the target column when the error is a loss of precision error and the operator of the predicate is a "greater than" or "less than or equal to" operator.

34. The apparatus of claim 33, wherein the logic for processing further comprises logic for identifying the predicate as true when the rounding down causes an underflow error and the operator of the predicate is a "greater than" operator.

35. The apparatus of claim 33, wherein the logic for processing further comprises logic for identifying the predicate as false when the rounding down causes an underflow error and the operator of the predicate is a "less than or equal to" operator.

36. The apparatus of claim 28, wherein the logic for processing further comprises logic for rounding up the input value to a data type of the target column when the error is a loss of precision error and the operator of the predicate is a "less than" or "greater than or equal to" operator.

37. The apparatus of claim 36, wherein the logic for further comprises logic for identifying the predicate as true when the rounding up causes an underflow error and the operator of the predicate is a "greater than or equal to" operator.

38. The apparatus of claim 36, wherein the logic for processing further comprises logic for identifying the predicate as false when the rounding up causes an underflow error and the operator of the predicate is a "less than" operator.

39. The apparatus of claim 28, wherein the logic for processing further comprises logic for adding a range predicate when casting down a "float" input value to a target column, when the "decimal" target column has a precision greater than 15.

40. The apparatus of claim 39, wherein the range predicate is used to construct start and stop keys to restrict a range of rows to be retrieved, so that only a few of rows are fetched.

41. An article of manufacture comprising a computer-readable media tangibly embodying instructions that, when read and executed by a computer system, results in the computer system performing a method for optimizing a query, the method comprising the steps of:
   (a) evaluating the query, wherein the query is comprised of at least one predicate having a first operand comprising an input value, an operator and a second operand comprising a target column;
   (b) casting down the input value to a data type of the target column before the target column is accessed, when the evaluated query is has non-matching first and second operands in the predicate;
   (c) detecting when an error occurs when the input value is cast-down, and then processing the predicate based on the detected error and the operator associated with the predicate; and
   (d) performing the query in the computer system to retrieve data from a database in order to present the data to a user.

42. The article of manufacture of claim 41, wherein the error is an overflow, underflow, or loss of precision error.

43. The article of manufacture of claim 41, wherein the processing step further comprises the step of not accessing the target column when the predicate is false.

44. The article of manufacture of claim 41, wherein the processing step further comprises the step of not evaluating the predicate when the predicate is true.

45. The article of manufacture of claim 41, wherein the processing step further comprises the step of pushing down the predicate when the predicate is neither true nor false.

46. The article of manufacture of claim 41, wherein the processing step further comprises the step of identifying the predicate as false, and not accessing the target column, when the operator of the predicate is an "equal" operator.

47. The article of manufacture of claim 41, wherein the processing step further comprises the step of identifying the predicate as true, not evaluating the predicate, and fetching all rows of the target column, when the operator of the predicate is a "not equal" operator.

48. The article of manufacture of claim 41, wherein the processing step further comprises the of replacing the predicate with a revised predicate based on the error, when the operator of the predicate is a "greater than," "greater than or equal to," "less than" or "less than or equal to" operator.

49. The article of manufacture of claim 48, wherein the processing step further comprises the step of identifying the predicate as false when the error is an overflow error and the operator of the predicate is a "greater than" or "greater than or equal to" operator.

50. The article of manufacture of claim 48, wherein die processing step further comprises the step of identifying the predicate as true when the error is an overflow error and the operator of the predicate is a "less than" or "less than or equal to" operator.

51. The article of manufacture of claim 48, wherein the processing step further comprises the step of identifying the predicate as true when the error is an underflow error and the operator of the predicate is a "greater than" or "greater than or equal to" operator.

52. The article of manufacture of claim 48, wherein the processing step further comprises the step of identifying the predicate as false when the error is an underflow error and the operator of the predicate is a "less dun" or "less than or equal to" operator.

53. The article of manufacture of claim 48, wherein the processing step further comprises the step of rounding down the input value to a data type of the target column when the error is a loss of precision error and the operator of the predicate is a "greater than" or "less than or equal to" operator.

54. The article of manufacture of claim 53, wherein the processing step further comprises the step of identifying the predicate as true when the rounding down causes an underflow error and the operator of the predicate is a "greater than" operator.

55. The article of manufacture of claim 53, wherein the processing step further comprises the step of identifying the predicate as false when the rounding down causes an underflow error and the operator of the predicate is a "less than or equal to" operator.

56. The article of manufacture of claim 48, wherein the processing step further comprises the step of rounding up the input value to a data type of the target column when the error is a loss of precision error and the operator of the predicate is a "less than" or "greater than or equal to" operator.

57. The article of manufacture of claim 56, wherein the processing step further comprises the step of identifying the predicate as true when the rounding up causes an underflow error and the operator of the predicate is a "greater than or equal to" operator.

58. The article of manufacture of claim 56, wherein the processing step further comprises the step of identifying the predicate as false when the rounding up causes an underflow error and the operator of the predicate is a "less than" operator.

59. The article of manufacture of claim 48, wherein the processing step further comprises the step of adding a range predicate when casting down a "float" input value to a "decimal" target column, when the "decimal" target column has a precision greater than 15.

60. The article of manufacture of claim 59, wherein the range predicate is used to construct start and stop keys to restrict a range of rows to be retrieved, so that only a few of rows are fetched.

* * * * *